United States Patent [19]

Arndt

[11] Patent Number: 4,483,400
[45] Date of Patent: Nov. 20, 1984

[54] WHEEL WITH STUB AXLE RELEASABLY TO END OF POWERED TUBULAR SHAFT

[76] Inventor: Walter E. Arndt, 1713 Third Ave. South, Fargo, N. Dak. 58102

[21] Appl. No.: 527,969

[22] Filed: Aug. 31, 1983

Related U.S. Application Data

[63] Continuation of Ser. No. 279,594, Jul. 1, 1981, abandoned.

[51] Int. Cl.$^3$ ............................................. A01B 73/00
[52] U.S. Cl. ..................................... 172/42; 172/240; 301/118; 403/349
[58] Field of Search ...................... 172/21, 42, 43, 240, 172/243; 403/348, 349, 354; 280/DIG. 6; 301/111, 118, 121

[56] References Cited

U.S. PATENT DOCUMENTS

| | | | |
|---|---|---|---|
| 314,783 | 3/1885 | Beebe | 403/348 X |
| 695,353 | 3/1902 | Turner | 403/349 X |
| 1,033,187 | 7/1912 | Metzger | 403/349 X |
| 1,696,462 | 12/1928 | Victor | 403/349 X |
| 2,229,497 | 1/1941 | Dontje | 172/21 |
| 2,323,813 | 7/1943 | Fred | 301/118 |
| 2,580,236 | 12/1951 | Mascaro | 172/21 |
| 2,864,294 | 12/1958 | Pearson, Jr. | 172/42 |
| 3,140,677 | 7/1964 | Fraser | 111/8 |
| 3,876,199 | 4/1975 | Eichenauer | 403/349 X |
| 4,133,390 | 1/1979 | Reaume | 172/43 |

Primary Examiner—Richard T. Stouffer
Attorney, Agent, or Firm—Burd, Bartz & Gutenkauf

[57] ABSTRACT

A removable transport wheel assembly for a ground penetrating machine such as a roto tiller for providing removable wheels for movement of the machine from place to place and loading and unloading. The machine has a transverse power driven shaft carrying earth working implements and having tubular transverse ends. Pin assemblies have shanks that pass diametrically through the transverse ends of the shaft. A pair of wheels are provided each having a stub axle with a diameter to be slip fitted in a transverse end of the shaft, and with an enlarged shoulder to engage the transverse end of the shaft to limit axle movement of the axle into the shaft. Each stub axle has a slot which engages the shank of the pin assembly. At the inner end of the slot is a groove which provides a seat for the shank of the pin assembly to releasably fasten the wheels to the shaft of the machine for transport from place to place. The wheels are readily removed for using the machine in an earth working function.

6 Claims, 9 Drawing Figures

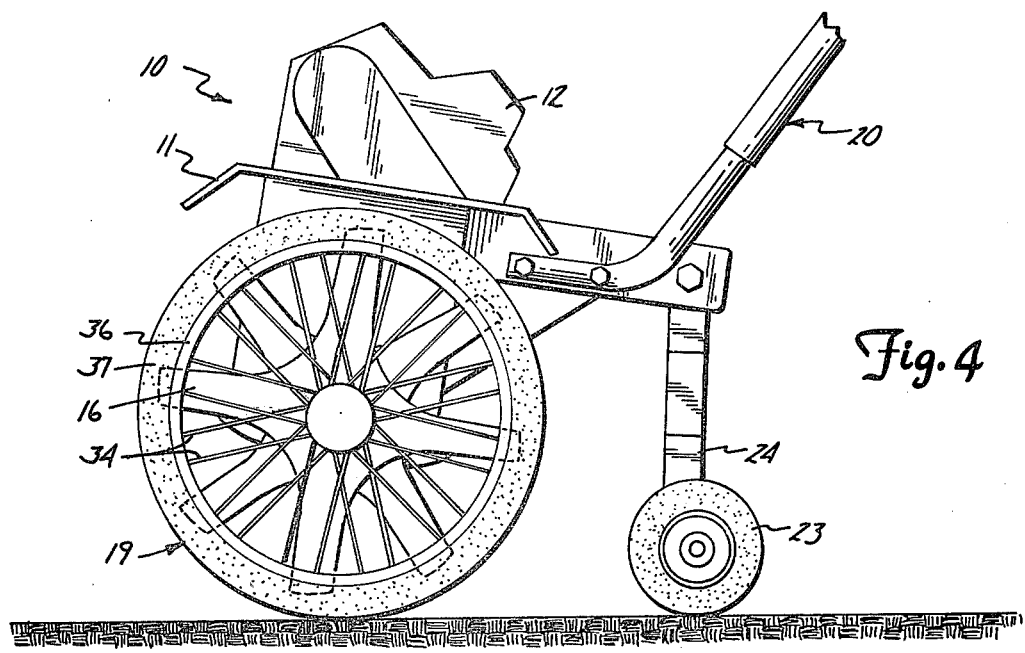
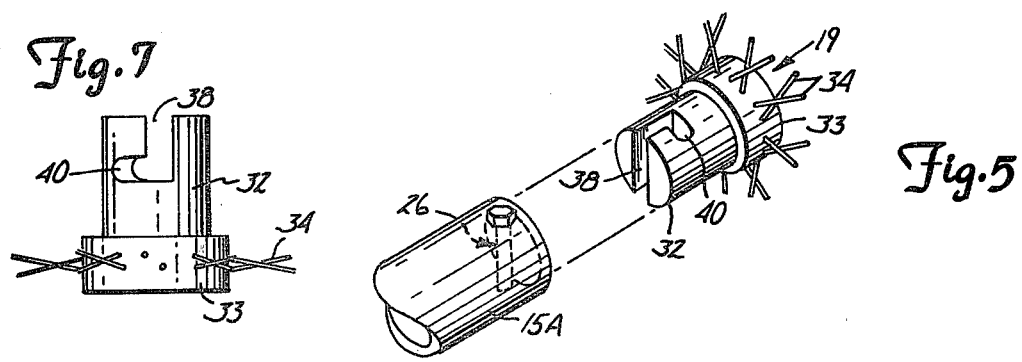
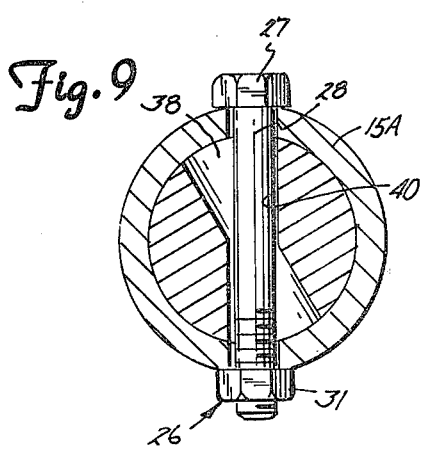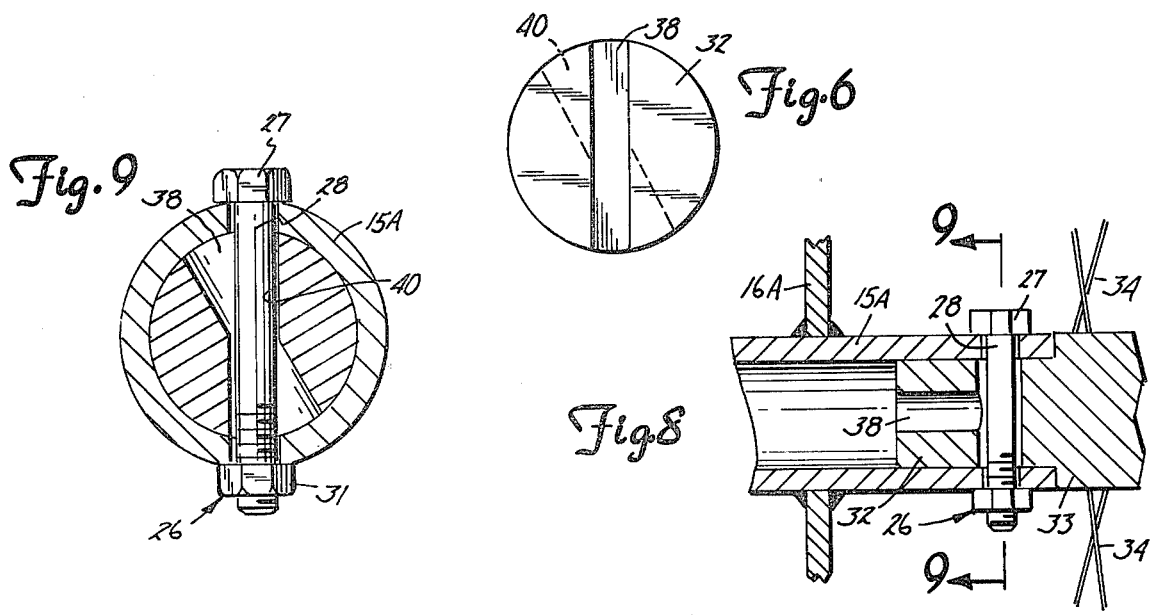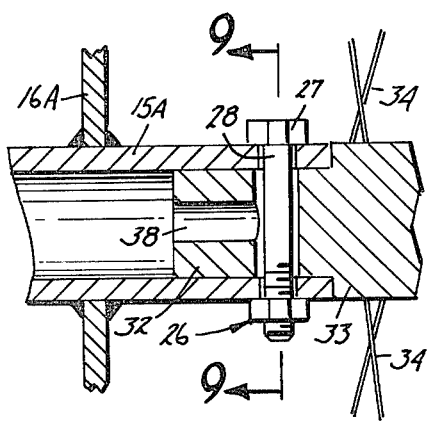

WHEEL WITH STUB AXLE RELEASABLY TO END OF POWERED TUBULAR SHAFT

This is a continuation of application Ser. No. 279,594, filed July 1, 1981, now abandoned.

SUMMARY OF THE INVENTION

Earth penetrating machines such as a roto tiller to till the soil, or a spiker to aerate the ground, are typically equipped with a transverse power driven shaft carrying earth penetrating tools such as rotor tiller blades. In normal operation the blades are rotated and the machine is advanced by the action of the rotating blades as the work is accomplished on the soil. The machine is necessarily heavy with a substantial proportion of the weight poised over the blades to assist in the earth penetration function. In general, due to the weight of these machines, transport is difficult. Transport of the machine over a surface upon which no work is intended, such as a lawn, can be damaging to the surface. Loading and unloading of such machines upon trailers or the like can be difficult also due to the weight.

The present invention relates to a transport wheel assembly for machines of the type described. The machine has a transverse shaft for carrying the earth penetrating equipment. The shaft has tubular transverse ends. The ends of the shaft are equipped with diametric pins located near the tips and spanning an inside diameter of the shaft. Removable transport wheels are provided for movement of the machine from place to place or for loading and unloading. Each wheel includes a stub axle for assembly to the transverse end of the shaft of the machine. The stub axle has a diameter slightly less than the inside diameter of the shaft of the machine to permit telescopic engagement therewith. The stub axle has a diametric slot. The stub axle fits into the end of the shaft with the pin of the shaft inserted in spanning relationship to the slot. At the inner end of the slot is a circumferential notch. When the pin reaches the inner end of the slot, the wheel is given a slight turn so that the pin is seated in the notch. The notch is positioned on the side of the slot such that forward rotation of the shaft to rotate the wheels to move the machine in a forward direction tends to keep the pin seated in the slot. Removal of the wheel is effected by twisting the wheel in a direction to unseat the pin from the slot and simply pulling the wheel away from the shaft of the machine.

IN THE DRAWINGS

FIG. 4 is an enlarged side elevational view of the roto tiller of FIG. 1 having the transport wheel assembly connected thereto;

FIG. 5 is a fragmentary perspective assembly view of a transport wheel stub axle and the roto tiller shaft;

FIG. 6 is an enlarged end view of the wheel hub shown in FIG. 5;

FIG. 7 is a bottom plan view of the wheel hub shown in FIG. 5;

FIG. 8 is an enlarged view in section of a transport wheel hub assembled to a transverse end of the roto tiller shaft; and FIG. 9 is an enlarged sectional view of a portion of the assembly of FIG. 8 taken along the line 9—9 thereof.

DESCRIPTION OF A PREFERRED EMBODIMENT

Figure 1:
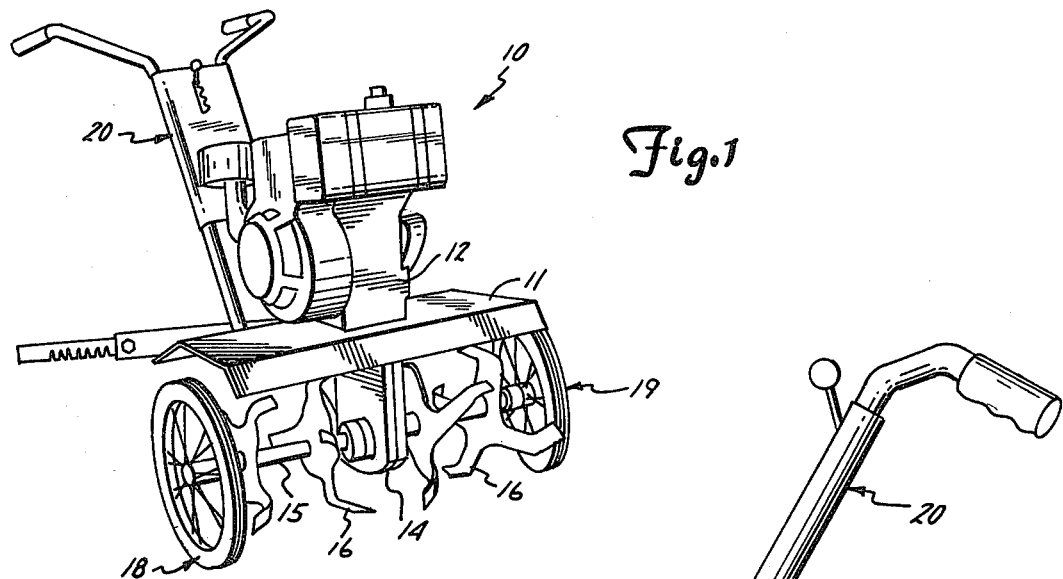
FIG. 1 is a perspective view of a roto tiller equipped with a transport wheel assembly of the invention.
Figure 2:
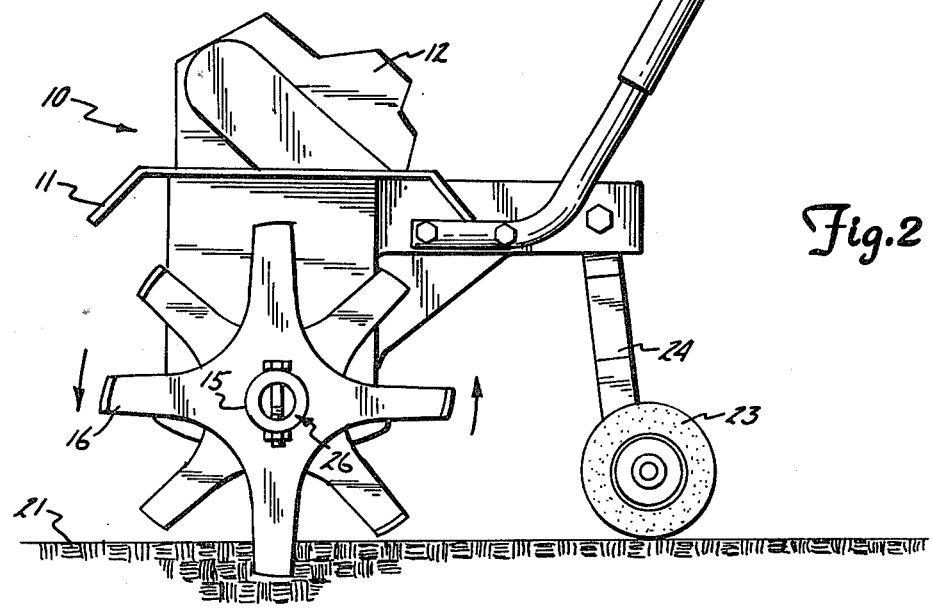
FIG. 2 is an enlarged side elevational view of the roto tiller of FIG. 1 with the wheel transport assembly removed.

Referring to the drawings, there is shown in FIGS. 1 and 2 a roto tiller 10 equipped with a transport wheel assembly having a pair of wheels 18 and 19 according to the invention. Wheels 18 and 19 are mounted in the configuration shown in FIG. 1 and dismantled in FIG. 2. Roto tiller 10 is a conventional machine having a frame including a horizontal platform or shield 11 mounting a drive motor 12. A power transmission 14 having a drive chain (not shown) transmits power to a transverse roto tiller shaft 15. Roto tiller shaft 15 carries a plurality of multiple tines or blades 16 for tilling the soil. As shown in FIG. 1, transport wheels 18, 19 are assembled to the transverse ends of shaft 15 for transport of the machine from place to place or for loading and unloading of the machine. The transport wheels 18, 19 have a diameter slightly greater than the diameter of the outer ends of the blades 16 and are driven by the roto tiller shaft 15. The roto tiller 10 is manipulated by the usual handle assembly 20. With the wheels 18, 19 dismantled from roto tiller 10, the roto tiller is used in conventional fashion as shown in FIG. 2 to till the soil 21. The tiller 10 moves along the soil in response to forward rotation of blades 16 which are driven by motor 12 as the operator manipulates handle 20. A pair of rearward guide wheels 23 are rotatably assembled to struts 24 which are in turn assembled to the frame of roto tiller 10 to assist in guiding the roto tiller over the earth as it performs a tilling function.

Figure 3:
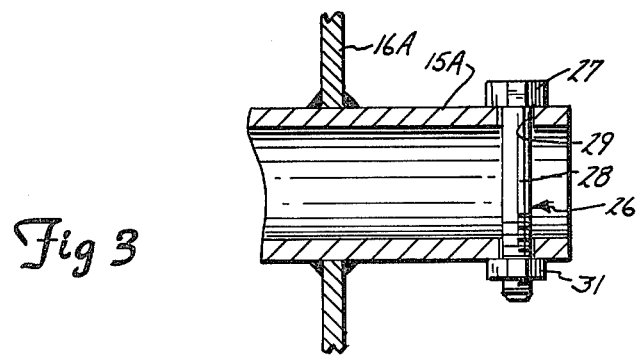
FIG. 3 is an enlarged view in section of a transverse end of the roto tiller shaft.

Transverse outer ends of roto tiller shaft 15 are equipped with pin and nut assemblies for mounting transport wheels 18, 19. As shown in FIG. 3, shaft 15 has a tubular transverse end 15A outwardly extended from outermost blade 16A. A pin and nut assembly 26 is spaced slightly inward from the outer end or tip of end 15A and spanning a diameter thereof. Pin and nut assembly 26 is comprised of a bolt having a head 27 located on the exterior surface of transverse end 15A, a shank 28 located in a hole 29 formed in the end 15A and secured on an opposite surface by a nut 31.

As shown in FIG. 4, with transport wheels 18, 19 assembled to roto tiller shaft 15, blades 16 are elevated and wheels 18, 19 are driven by shaft 15 to move roto tiller 10 forwardly along a surface. Connecting means for releasably assembling the transport wheels 18, 19 to the roto tiller shaft 15 are shown in FIGS. 5 through 9. Transport wheel 19 includes a stub axle 32 assembled in a diametrically enlarged collar or hub 33. A plurality of spokes 34 extend outwardly from collar 33 to a rim 36. A tire 37 is mounted on the rim 36. Stub axle 32 has a diameter slightly less than the inner or inside diameter of transverse end 15A of shaft 15 to enable a slip fit relationship. Collar 33, on the other hand, has a shoulder with a diameter greater than the inside diameter of the transverse end 15A, whereby the hub is engageable with the transverse end to limit axial movement of the axle into shaft 15. Stub axle 32 has a diametric slot 38 with a width slightly larger than the diameter of shank 28 of pin and nut assembly 26. Slot 38 extends axially inward of stub axle 32 and terminates at a circumferential groove 40 formed at a right angle to slot 38. As shown in FIGS. 5 and 7, groove 40 extends diametrically through stub axle 32 and is of a width sufficient to accommodate the shank 28 of pin and nut assembly 26.

In use, wheel 19 is mounted on transverse end 15A of shaft 15 by aligning slot 38 with shank 28 of pin and nut assembly 26 with the roto tiller 10 slightly tilted so as to slightly elevate the end blade 16A. Stub axle 32 is inserted into the end of transverse end 15A with the shank 28 riding in slot 38. When shank 28 reaches the end of slot 38, wheel 19 is given a slight rearward rotation whereby the shank 28 rotates into and is seated in the groove 40 as shown in FIGS. 8 and 9. The other wheel 18 is assembled to the opposite transverse end of shaft 15 in similar fashion. Groove 40 extends away from the slot 38 in the intended direction of rotation of the wheel for forward movement. Thereby forward rotation of shaft 15 maintains the shank 28 seated in the groove 40. The procedure for dismantling wheel 19 from shaft 15 is the reverse. The wheel 19 is rotated in a forward direction to unseat the shank 28 of pin assembly 26 from the groove 40. Wheel 19 is then simply withdrawn from the transverse end 15A. The same procedure is applied to the other wheel 18 and roto tiller 10 is again ready to perform a work function.

While there has been shown and described a particular embodiment of transport wheel assembly for a ground working machine, it will be apparent that certain modifications and alterations can be had without departing from the scope and spirit of the invention.

The embodiments of the invention in which an exclusive property or privilege is claimed are defined as follows:

1. A ground penetrating machine having a power driven rotatable transverse shaft with transverse first and second tubular ends, earth penetrating tools mounted on the shaft, first pin means having a shank extended through said shaft proximate the first tubular end, second pin means having a shank extended through said shaft proximate the second tubular end, transport wheel assemblies releasably mounted on the first and second tubular ends of the shaft, each wheel assembly having a wheel having a stub axle with a diameter slightly less than the inner diameter of one end of the shaft to enable a slip fit of the stub axle into the one end of the shaft, said axle having a hub having a shoulder with a diameter greater than the inner diameter of the one end of the shaft, said hub being engageable with the one end of the shaft to limit axial movement of the axle into the shaft, a slot located on the end of the stub axle and extending axially inward, said slot positioned for engagement of a shank when the stub axle is inserted in the one end of the shaft and a circumferential groove extended through the stub axle from the inward end of the slot at substantially a right angle to the slot to provide a seat for the shank when the stub axle is inserted in the one end of the shaft, said groove extending circumferentially away from the slot in the intended direction of rotation of the shaft to move the machine in a forward direction and having substantially parallel, axially spaced apart side walls for close accommodation of the shank of one pin means in contiguous relationship to the side walls whereby upon powered rotation of the shaft, the shank is moved into the seat of the groove and retained therein with the wheel axially locked on the shaft, and upon forward rotation of the wheel with respect to the shaft, the shank is moved back to the slot for axial removal of the wheel from the shaft.

2. The transport wheel assembly of claim 1 wherein: said shank extends diametrically through the shaft, said slot extending diametrically across said stub axle.

3. The transport wheel assembly of claim 2 wherein: each pin means is comprised as a nut and bolt assembly.

4. An assembly for releasably fixing a wheel to the end of a powered tubular shaft, comprising: a powered tubular shaft having an end, pin means located proximate the end of the shaft and having a shank extending through the shaft; a wheel having a stub axle with a diameter slightly less than the inner diameter of the end of the shaft so as to be telescopically engageable with the end of the shaft, said axle having a hub having a shoulder with a diameter greater than the inner diameter of the one end of the shaft, said hub being engageable with the end of the shaft to limit axial movement of the axle into the shaft, slot means located on the stub axle engageable with the shank of the pin means when the stub axle is telescopically engaged in the end of the shaft, and groove means extending circumferentially from the slot means in the intended direction of powered rotation of the shaft and having substantially parallel, axially spaced apart side walls for close accommodation of the shank of the pin means in contiguous relationship to the side walls providing a seat for the shank when the stub axle is fully telescopically inserted in the end of the shaft whereby upon powered rotation of the shaft, the shank is moved into the seat of the groove and retained therein with the wheel axially locked on the shaft, and upon rotation of the wheel with respect to the shaft, the shank is moved back to the slot for axial removal of the wheel from the shaft.

5. The assembly of claim 4 wherein: said shank extends diametrically through the shaft, said slot extending diametrically across said stub axle.

6. The assembly of claim 4 wherein: the pin means comprises a nut and bolt assembly.

* * * * *